United States Patent
Chen et al.

(10) Patent No.: US 12,421,660 B2
(45) Date of Patent: Sep. 23, 2025

(54) ENHANCED BONDING AND SEALING BETWEEN TWO FIBROUS MATERIALS

(71) Applicant: Ecoinno (H.K.) Limited, Hong Kong (CN)

(72) Inventors: George Dah Ren Chen, Hong Kong (CN); Yiu Wen Chang, Hong Kong (CN)

(73) Assignee: ECOINNO (H.K.) LIMITED, Hong Kong (CN)

( * ) Notice: Subject to any disclaimer, the term of this patent is extended or adjusted under 35 U.S.C. 154(b) by 71 days.

(21) Appl. No.: 18/020,218

(22) PCT Filed: Aug. 9, 2021

(86) PCT No.: PCT/IB2021/057307
§ 371 (c)(1),
(2) Date: Feb. 7, 2023

(87) PCT Pub. No.: WO2022/029735
PCT Pub. Date: Feb. 10, 2022

(65) Prior Publication Data
US 2023/0272579 A1    Aug. 31, 2023

Related U.S. Application Data

(60) Provisional application No. 63/063,210, filed on Aug. 7, 2020.

(51) Int. Cl.
*D21C 9/00* (2006.01)
*D21H 11/12* (2006.01)
(Continued)

(52) U.S. Cl.
CPC ............ *D21C 9/007* (2013.01); *D21H 11/12* (2013.01); *D21H 11/14* (2013.01); *D21H 11/18* (2013.01)

(58) Field of Classification Search
CPC ...................................... D21C 9/007
See application file for complete search history.

(56) References Cited

U.S. PATENT DOCUMENTS

2018/0094383 A1    4/2018  Bilodeau

FOREIGN PATENT DOCUMENTS

| CN | 109152394 | 1/2019 |
| CN | 209965986 | 1/2020 |

(Continued)

OTHER PUBLICATIONS

International Preliminary Report on Patentability issued in App. No. PCT/IB2021/057307, dated Feb. 7, 2023, 5 pages.

*Primary Examiner* — Jeffry H Aftergut
(74) *Attorney, Agent, or Firm* — Loeb & Loeb LLP

(57) ABSTRACT

Embodiments of the invention overcome the shortcomings of prior technologies by infusing nanocellulose in a fibrillated form to enhance the properties of cellulose pulp. These properties may include, for example, the mechanical and barrier properties, i.e., tensile strength, liquid, and gas impermeability such as oxygen, carbon dioxide, and oil, can be improved substantially. Another embodiment of the invention further provide a fibrillated cellulose composite material that include properties of being a strength-enhancing agent, an oligomer, carboxylic acid, plasticizer, an antimicrobial agent, water repellant, oil repellant, and/or a transparent composite.

8 Claims, 13 Drawing Sheets

(51) Int. Cl.
     *D21H 11/14*           (2006.01)
     *D21H 11/18*           (2006.01)

(56) References Cited

FOREIGN PATENT DOCUMENTS

| | | |
|---|---|---|
| EP | 0511562 A1 * | 11/1992 |
| EP | 3045406 | 7/2016 |
| JP | 2018527447 | 9/2018 |
| WO | 2009086141 | 7/2009 |

* cited by examiner

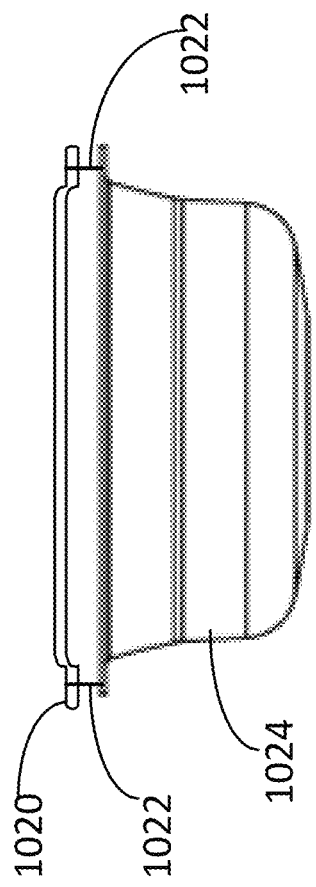
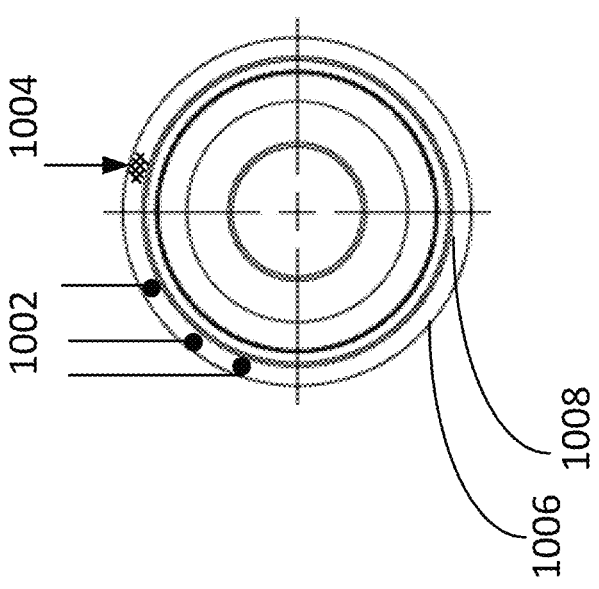
FIG. 10A
FIG. 10B

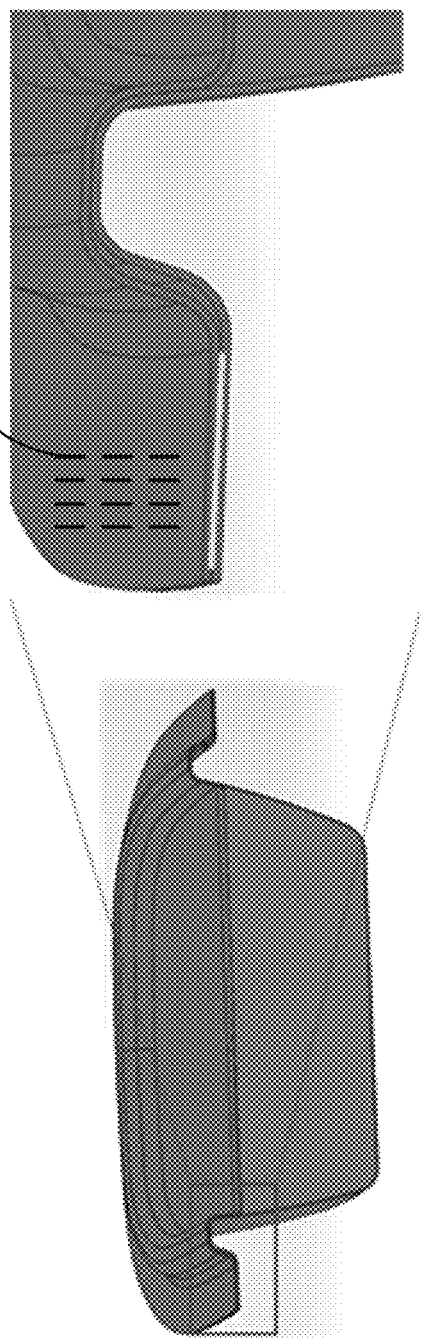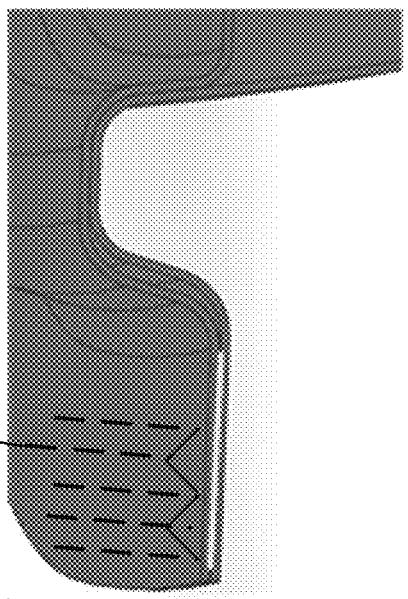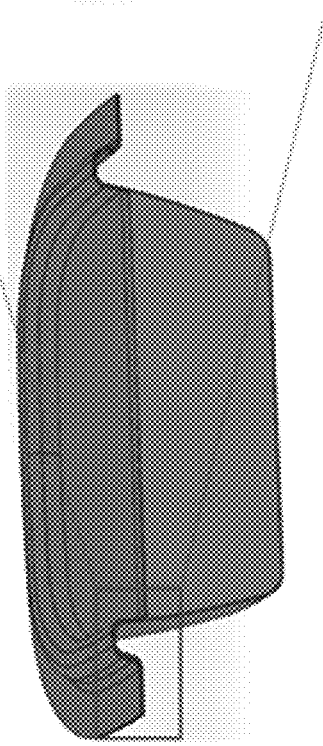
FIG. 11B
FIG. 11C

ENHANCED BONDING AND SEALING BETWEEN TWO FIBROUS MATERIALS

CROSS-REFERENCE TO RELATED APPLICATIONS

This application claims priority to International Application No. PCT/IB21/057307, filed on Aug. 9, 2021, and U.S. provisional patent application, Ser. No. 63/063,210 filed on Aug. 7, 2020, whose disclosures are incorporated by reference in their entirety herein.

TECHNICAL FIELD

Aspects of the invention generally relate to renewal and recyclable material. More particularly, embodiments of the invention relate to fibrillated cellulose materials made for consumer products.

BACKGROUND

Increasing concerns over the environmental crisis—plastic waste pollution—has triggered extensive investigations into sustainable and renewable materials. In the effort to circumvent petroleum derivative polymers, a naturally occurring biopolymer, plant-based—cellulose fibers offers alternatives to the material research community. Cellulose fibers are gaining their attention due to the ubiquitous source, sustainable, renewable, and more importantly, it affords the end product with 100% biodegradability in nature.

However, many existing biodegradable products based on cellulose fibers fail to live up to the expectation. For example, the cost of producing these cellulose fibrous products is not economically conducive for mass production. In addition, due to the need for water resistance, oil resistance or non-stick property, many of the cellulose fibrous products rely heavily on synthetic chemical compositions to achieve these properties or effects. For example, many existing products require a coat of fluorocarbon to be applied on the surface that come in contact with food or beverage items. Moreover, some of these fluorocarbon-based chemicals, such as perfluorooctanoic acid (PFOA or C8), can cause long-term negative health and environmental effects.

In addition, current practices do not create two layers or layers of fibrillated cellulose materials. Rather, prior practices merely attempt to produce one layer from a cellulose pulp solution.

SUMMARY

Embodiments of the invention overcome the shortcomings of prior technologies by infusing nanocellulose in a fibrillated form to enhance the properties of cellulose pulp. These properties may include, for example, the mechanical and barrier properties, i.e., tensile strength, liquid, and gas impermeability such as oxygen, carbon dioxide, and oil, can be improved substantially.

Another embodiment of the invention further provide a fibrillated cellulose composite material that include layers or mixtures of fibrillated cellulose to create properties of being a strength-enhancing agent, an oligomer, carboxylic acid, plasticizer, an antimicrobial agent, water repellant, oil repellant and/or a transparent composite. The composite material further may be generally free from chemical additives to enhance the above properties. In yet another embodiment, the composite material may further include a base substrate such as pulp and another layer such as fibrillated cellulose.

In a further embodiment, aspects of the invention create a strong bonding between two discrete units of the end products, such as a lid and a capsule so that items contained therein may be preserved without adding non-recyclable items, such as aluminum lid or a plastic lid.

BRIEF DESCRIPTION OF DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 10A and B illustrate bonding between a first composite material and a second composite material according to one embodiment.

FIGS. 11A to 11C illustrate further features of a bonding according to one embodiment.

DETAILED DESCRIPTION

Figure 1:
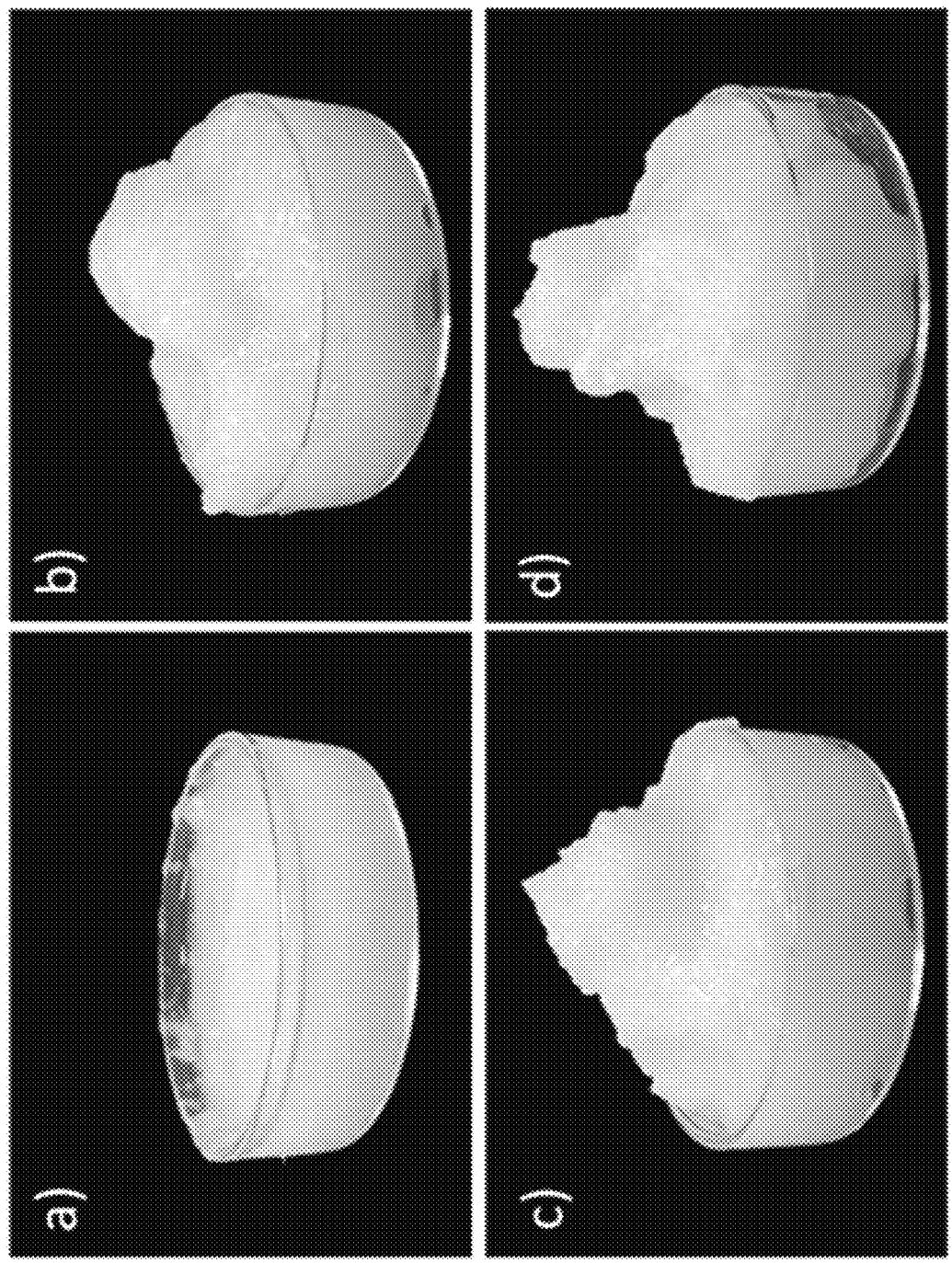
FIGS. 1A through 1D illustrate a material of the cellulose fibers aqueous suspension according to one embodiment.

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. The following detailed description may, therefore, not to be taken in a limiting sense.

Embodiments of the invention include a material, such as a Green Composite Material™ (GCM™), that may comprise fibrillated cellulose as a core material without any material. In one embodiment, the composite material may include pulp and fibrillated cellulose. In another embodiment, the composite material may be generally free from chemical additives or agents. In yet another embodiment, the composite material may be independently derived plant fibers. In one embodiment, the chemical additives or agents may be naturally based or non-toxic. In another embodiment, the chemical additives or agents may be created by laboratories. In some embodiments, these plant fibers may be derived from bagasse, bamboo, abaca, sisal, hemp, flax, hop, jute, kenaf, palm, coir, corn, cotton, wood, and any combination thereof. In yet other embodiments, the plant fibers may be pre-processed or semi-processed cellulose. In other embodiments, a green composite material with fibrillated cellulose may be obtained by processing plant fibers through a refining process, such as a high-pressure homogenizer or refiner. In further embodiments, a composite material with fibrillated cellulose obtained via bacterial strains (without the cellulose producing microorganism). In alternative embodiments, a material with fibrillated cellulose may be obtained from a marine source.

In one embodiment, the shape and size of the cellulose may depend on the source of origin of the fiber or a combination of fibers and the process of making it. Nonetheless, fibrillated cellulose generally has a diameter and a length, as described below. The fibrillated cellulose, in one embodiment, may have a diameter of about 1-5000 nanometer (nm). In yet another embodiment, the fibrillated cellulose may have a diameter of about 5-150 nm or from about 100-1000 nm. In yet another embodiment, the fibrillated cellulose may have a diameter of about 5000-10000 nm.

In yet a further embodiment, the material may have enhanced properties that heighten, enhance, or improve various properties without toxic chemical additives or agents. In another embodiment, the material having various properties that are suitable to carry food or liquid items that is generally free from chemical additives or agents. For example, as shown in prior art, various toxic chemical additives or agents have added to materials during manufacturing process or coated thereon that provide a desirable tensile strength, either dry or wet, enhanced oil barrier, gas and/or liquid impermeability. Aspects of the invention, instead of with the various toxic chemical additives or agents added to the material, include a composite material with the fibrillated cellulose that is generally free from these additives or agents.

For example, the fibrillated cellulose may have a length of about 0.1-1000 micrometers, about 10-500 micrometers, about 1-25 micrometers, or about 0.2-100 micrometers. In some embodiments, a material with fibrillated cellulose of different diameters, such as with a weight ratio of 1:100. In another embodiment, the fibrillated cellulose may be with a weight ratio of 1:50. In a further embodiment, the material with mixed fibrillated cellulose may afford the advantages such as improved tensile strength, either dry or wet, enhanced oil barrier, gas and/or liquid impermeability, and cost savings.

In some embodiments, a material with fibrillated cellulose may possess a property of an oxygen transmission rate of about 8000 $cm^3$ $m^{-2}$ 24 $h^{-1}$ or less. In another embodiment, the oxygen transmission rate of about 5000 $cm^3$ $m^{-2}$ 24 $h^{-1}$ or less. In yet another embodiment, the oxygen transmission rate of about 1000 $cm^3$ $m^{-2}$ 24 $h^{-1}$ or less.

Furthermore, in yet some embodiment, the material may possess a property of a water vapor transmission rate of about 3000 g $m^{-2}$ 24 $h^{-1}$ or less. Moreover, for another embodiment, the water vapor transmission rate may be about 1500 g $m^{-2}$ 24 $h^{-1}$ or less.

In some embodiments, a material may possess a property of a dry tensile strength of about 30 MPa or higher. In another embodiment, the dry tensile strength may be about 70 MPa. In yet another embodiment, the dry tensile strength may be about 100 MPa or higher. In some embodiments, the material may possess a property of a dry tensile modulus of about 4 GPa or higher. In another embodiment, the dry tensile modulus of about 6 GPa or higher.

In some embodiments, the material may possess a property of a dry tensile index of about 45 Nm $g^{-1}$ or higher. In another embodiment, the property may be about 80 Nm $g^{-1}$ or higher.

In some embodiments, the material may possess a property of a wet tensile strength of about 5 MPa or higher. In another embodiment, the wet tensile strength may be about 20 MPa or higher.

In some embodiments, the material may possess a property of a wet tensile modulus of about 0.4 MPa or higher. In another embodiment, the wet tensile modulus may be about 1.0 MPa or higher.

In some embodiments, the material may possess a property of a wet tensile index of about 5 Nm $g^{-1}$ or higher. In another embodiment, the wet tensile index may be about 20 Nm $g^{-1}$ or higher.

In an alternative embodiment, the material may include an adhesive agent to enhance dry and/or wet strength. In one embodiment, the adhesive agent may include polymers. In other embodiments, the adhesive agent may include metal salts. In another embodiment, the adhesive agent may include oligomers. In yet other embodiment, the adhesive agent may include a carboxylic acid. In yet an alternative embodiment, the adhesive agent may include a plasticizer. In some embodiments, the weight ratio of fibrillated cellulose to the adhesive agent in the present invention may be about 33:1 to 1:1.

For example, the polymers may include polyester, gelatin, polylactic acid, chitin, sodium alginate, thermoplastic starch, polyethylene, polyethylene terephthalate, chitosan, chitin glucan, polyvinyl alcohol, or polypropylene. In one embodiment, the polymers may include in chemical additives that may be applied to the composite materials of aspects of the invention. For example, the chemical additives may be embedded in the material itself or may be sprayed or coated thereon.

In another embodiment, the adhesive agent may include water soluble resins. For example, modified polyamines, polyamide epichlorohydrin, polyamideamine-epichlorohydrin, adipic acid-diethylenetriamine-epichlorohydrin. In some embodiments, the weight ratio of fibrillated cellulose to adhesive agent in the present invention may be 99:1 to 1:1.

In yet another embodiments, the adhesive agent may include metal salts. For example, the metal salts may include potassium zirconium carbonate, potassium aluminum sulphate, calcium carbonate, and calcium phosphate. In some embodiments, the weight ratio of fibrillated cellulose to the adhesive agent in the present invention may be about 99:1 to 1:1.

In another embodiment, the adhesive agent may include oligomers. In one example, the oligomers may include oligonucleotide, oligopeptide, and polyethylene glycol. In some embodiments, the weight ratio of fibrillated cellulose to the adhesive agent in the present invention may be about 99:1 to 1:1.

In yet other embodiment, the adhesive agent may include a carboxylic acid. For example, the carboxylic acid may include citric acid, adipic acid, and glutaric acid. In some embodiments, the weight ratio of fibrillated cellulose to the adhesive agent in the present invention may be about 33:1 to 1:1.

In embodiment, the adhesive agent with the plasticizer may reduce a brittleness and gas permeability of the adhered composite. In some embodiments, the plasticizer may include polyol. In one embodiment, the polyol may comprise glycerol. In one embodiment, the polyol may comprise sorbitol. In one embodiment, the polyol may comprise pentaerythritol. In some embodiments, the polyol may comprise polyethylene glycol. In some embodiments, the weight ratio of plasticizer to the composite material to an adhesive agent is about 5:99:1 to about 1:1:1.

In another embodiment, the plasticizer may comprise branched polysaccharide, wax, fatty acid, fat and oil.

Aspects of the invention may further include a water repellent agent as a chemical additive to repel gas and/or liquid state water. In some embodiments, the water repellent agent comprises an animal-based wax, an animal-based oil or an animal-based fat. In one embodiments, the water repellent agent comprises a petroleum-derived wax or a petroleum-based wax. In other embodiments, the water repellent agent comprises a plant-based wax, a plant-based oil or a plant-based fat.

In some embodiments, an animal-based water repellent may comprise beeswax, shellac and whale oil.

In some embodiments, a petroleum-based wax water repellent may comprise paraffin wax, paraffin oil and mineral oil.

In some embodiments, a plant-based water repellent may comprise carnauba wax, soy oil, palm oil, palm wax, carnauba wax and coconut oil.

In some embodiments, a water repelling agent may comprise adhesive agent such as potassium zirconium carbonate, potassium aluminum sulphate, calcium carbonate and calcium phosphate, alkyl ketene dimer, acrylic polymer, and fluorine-based polymer.

In a further embodiment, the material may comprise fibrillated cellulose further optionally may include an antimicrobial agent. In some embodiments, an antimicrobial agent may comprise tea polyphenol. In some embodiments, an antimicrobial agent may comprise pyrithione salts, parabens, paraben salts, quaternary ammonium salts, imidazolium, benzoic acid sorbic acid and potassium sorbate.

In yet another embodiment, aspects of the invention may include a material having fibrillated cellulose that may be coated or mixed with non-fluoride oil-resistant, water-resistant, and heat-tolerant polymer. For example, the non-fluoride polymer may be mixed with the fibrillated cellulose during the impregnation process. In another embodiment, the non-fluoride polymer may be sprayed or coated on the fibrillated cellulose.

Moreover, another embodiment of the invention may include a material having fibrillated cellulose further optionally comprises a transparent composite to increase the transmission of light with wavelength from about 300 to 800 nm. In some embodiments, a material may comprise branched polysaccharides. In some embodiments, the weight ratio of the material to transparent composite ranges differently, which may depend on the transparency required, e.g., about 99:1 to about 1:99.

In some embodiments, branched polysaccharides may comprise starch, dextran, xantham gum, and galactomannan. The source of these branched polysaccharides includes but not limited to corn, beans, asparagus, brussels sprouts, legumes, oats, flax seeds, dicots, grasses, coffee grounds and coffee silverskin.

In some embodiments, a dextran may comprise agarose, pullulan, and curdan.

In yet another aspect of the invention may include an oil repellent agent as a chemical additive to repel oil. In some embodiments, the oil repellent agent comprises a water-based emulsion, water-based fluorine emulsion.

In some aspects, provided herein is the manufacture of products made by the material disclosed herein, and readily forms into designated shape, e.g., either 2 dimensional or 3-dimensional. For example, the two-dimensional example may be a planar sheet where the planar sheet may be used to be decomposed for forming end products. In another example, the material may be in a solution that may be ready for forming end products. In yet another embodiment, the three-dimensional example may be end products.

Figure 5:
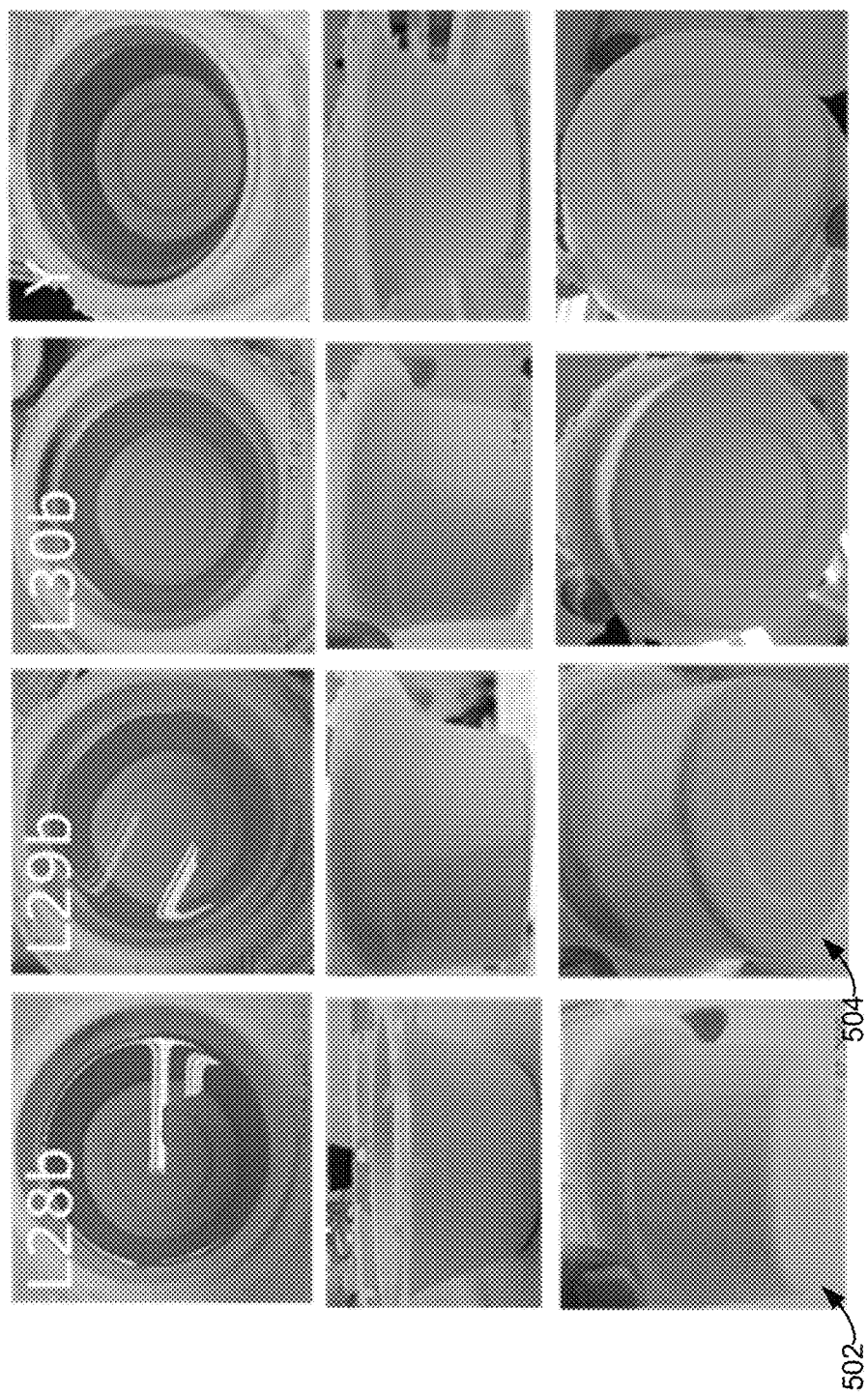
FIG. 5 illustrates images of containers made of fibrillated cellulose L28b, L29b, L30b, and Y were able to hold oil for 10 days according to one embodiment.
Figure 6A:
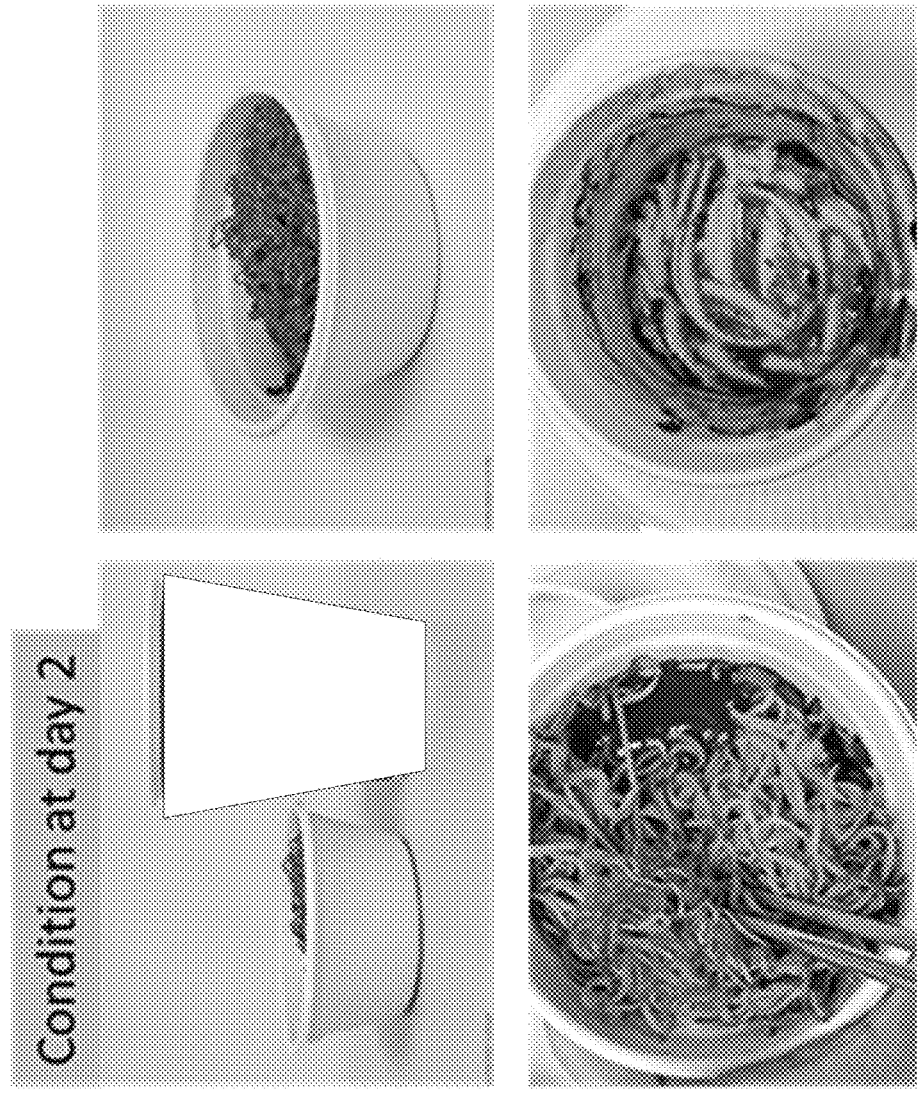
FIG. 6A are images showing food items with boiling water in a material for about 5 minutes according to one embodiment.
Figure 6B:
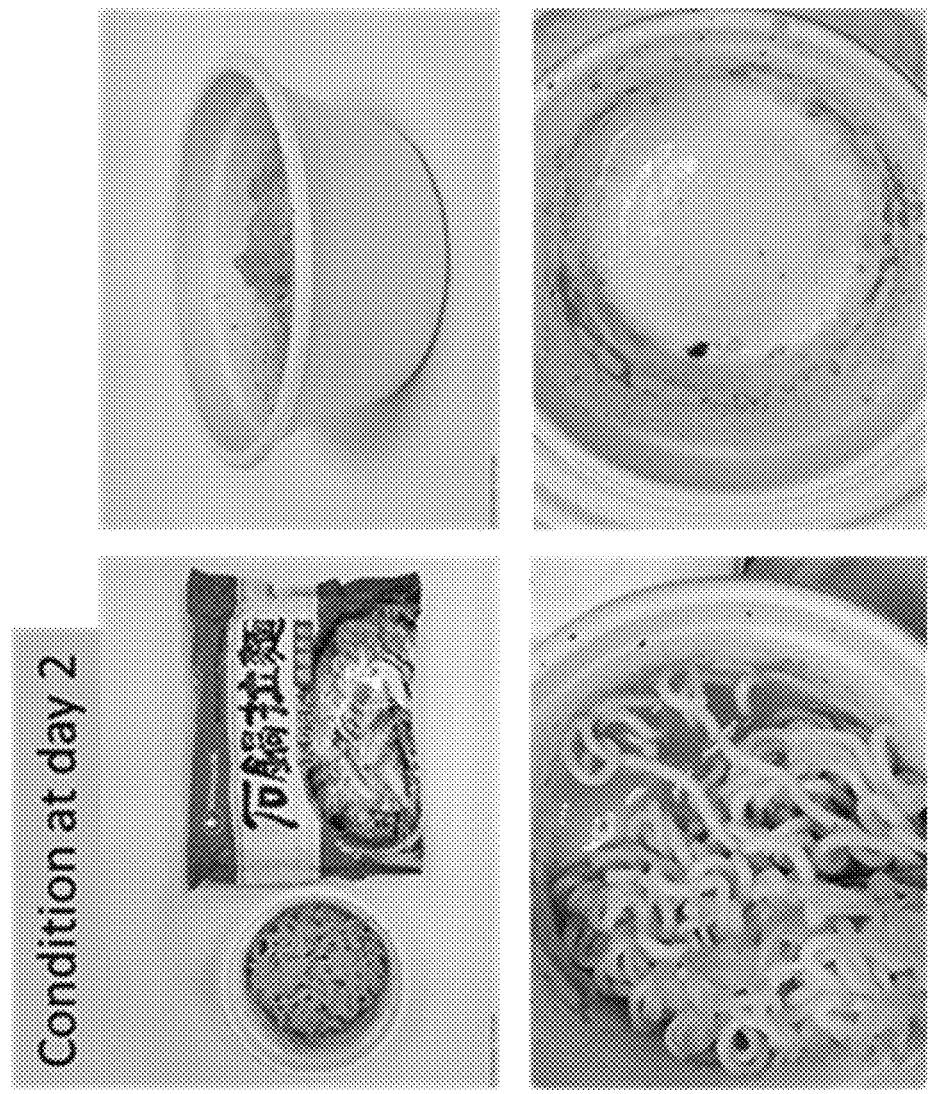
FIG. 6B are images showing food items with boiling water and under microwave being heated at 800 W for 2 minutes according to one embodiment.
Figure 7:
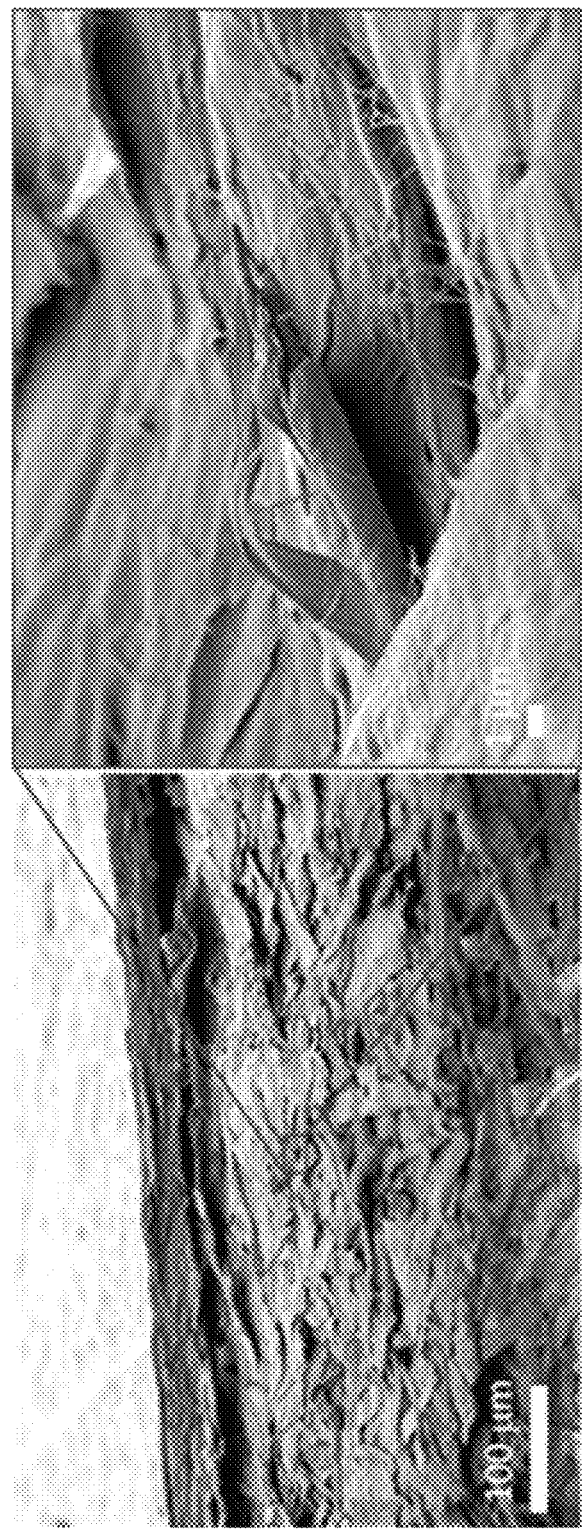
FIG. 7 is another SEM image of a material for a structure of fibrillated cellulose used in food container according to one embodiment.

In one aspect, the end product may include containers for digestible or edible items, such as those shown in FIG. 5 to FIG. 7. For example, the end products that embody the materials as described in this application may include food containers or packages. Using it as an example and not as a limitation, the food containers or packages may include airplane or airline meal containers, disposable cups, ready-to-eat food containers, capsules, ice cream carton or containers, and chocolate containers. In some embodiments, a product may comprise instant food containers that may further contain spices, e.g., instant cup noodles, instant soup, or the like. In such example, for a consumer to digest or consume the digestible or edible items contained in the container embodying aspects of the invention, the container may be subjected to water or liquid at high temperature, such as about 100 degrees Celsius.

In another embodiment, for products that may be used one an airplane meal and beverage containers. Currently, the airplane meal containers are made of various forms of plastic for properties of lightweight, rigidity, oil resistance, etc. In addition, existing plastic containers may be subjected to heating via an oven. The heating may release carcinogenic substance from the plastic container to the digestible or edible items. As such, such effects are not desirable. Embodiments of the invention, along with the properties described above, may exhibit properties that are water resistant, high heat tolerance, oil resistant, etc., without releasing carcinogenic substance.

In another embodiment, the capsule example may be a capsule for machines for hot beverage. For example, the capsule may be contain coffee, tea, herbs, or other drinks. For example, the capsule may be a disposable capsule. In another example, the capsule may be a disposable coffee bag or pouch. In such an example, the electrical beverage machine may deposit or inject water at high temperature or high pressure to the capsule so that the beverage making process may start and that the coffee may drip out of the capsule or pouch to a consumer's cup. As the capsule or pouch comprises the biodegradable and sustainable materials having one or more properties as described above, the capsule or pouch may be easily recycled without creating burden to the environment.

In one embodiment, the capsule may have a sidewall with a thickness of about 500 micron. In one embodiment, the capsule may include a top or a lid having a thickness of about 500 micron. In yet another embodiment, the capsule may include a bottom thickness of about 300 micron. In yet a further embodiment, the capsule may be formed/created in one pass from the former (to be discussed below) and that the thickness of a top, a sidewall and a bottom with different thickness.

In some embodiments, a product may include a filter to separate, whether permanently, semi-impermeable, or lightly impermeable to particles or molecules in fluid. For example, the product may include a face mask or filter membrane with solid-liquid separation, liquid-liquid separation, or gas-liquid separation effects, etc.

In some embodiments, a product may comprise cosmetic or skincare container products, medical products, e.g., powder case, palette, protective glass, or medical-grade disposals. In some embodiments, a product may comprise part of medical device, automobile, electronic device, and construction material (as reinforcement material).

Overall, in one embodiment, containers embodying materials of the invention may be in a form of containers, planar sheets, trays, plates, reels, boards, or films. In such an embodiment, a width or length of the material may range from about 0.01 mm to 10000 mm or above. In one embodiment, the width or length may range from about 0.01 mm-1000 mm. In the embodiment where the films may be a thin-layered film with a thickness of about 0.01-3.0 mm. In one embodiment, the thickness may be about 0.02-0.20 mm. In yet other embodiments, the product may comprise a food package containing oil to water weight ratio of about 100:1 to about 1:100.

In another embodiment, aspects of the invention may provide a process of manufacturing, generating, or creating the material comprising fibrillated cellulose having properties of the above.

Example 1

In addition to the material provided above, aspects of the invention may include a cellulose fibrillation process or method.

Figure 8:
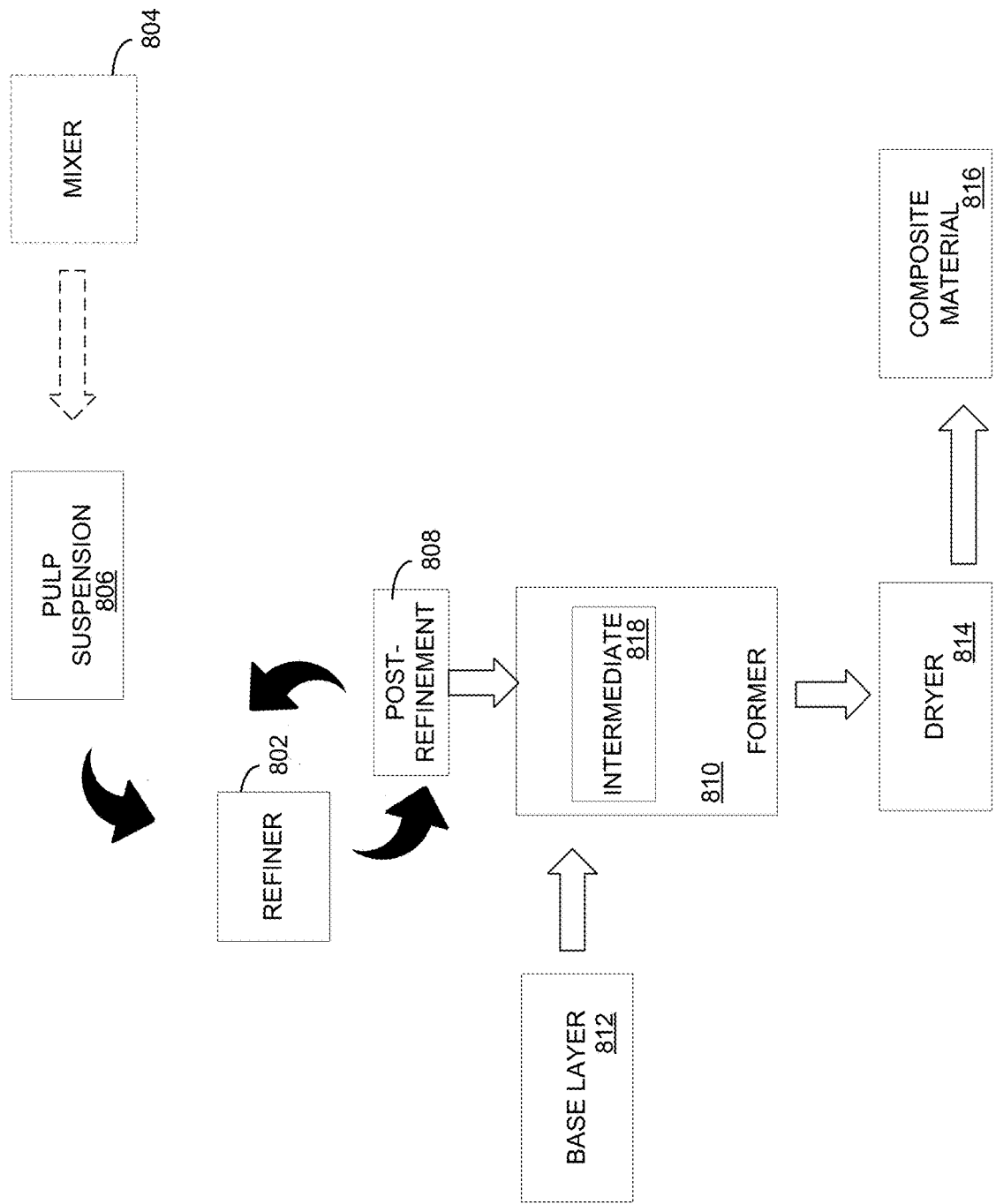
FIG. 8 is a flow diagram of a method for generating a material according to one embodiment.

Referring now to FIG. 8, a flow diagram may illustrate a method for creating such material according to one embodiment. In one embodiment, the examples shown below are generally free from toxic chemical additives to improve mechanical properties of the composite material. For example, a cellulose paper board (about 3.0 wt. %) was torn into pieces such as A4 sized paper. The shredded pieces is thrown into a pulping machine (not shown in FIG. 8). The pulping process may take about 20 minutes. Next, for example, a refiner 802 may be used to begin the process. For example, the refiner 802 may be a homogenizer, a grinder, a chemical refinement chamber/bath, a combination of a mechanical and chemical fiber refinement device, or the like. In one embodiment, in the example of a grinder, the refiner 802 may include a two grindstones facing each other. The separations or distances between the two grindstones may be adjusted as a function of the desirable end products. In another embodiment, surface grooves or patterns may be adjusted as a function of the desirable end products. As such, a pulp suspension 806 is then fed into the refiner, optionally for about 1-10 passes. In other instances, the pulp suspension 806 may be fed into a refiner (not shown), e.g., colloid mill, double disk grinder, to refine further the cellulose pulp before entering the refiner 802.

In one embodiment, FIGS. 1a to 1d show the condition of fibrillated cellulose with increasing numbers of passes. For example, FIG. 1a may represent a cellulose fibers aqueous suspension with 0 cycle or pass. In other words, the content of the pulp suspension 806 as shown in FIG. 1a where the pulp forms no fibrillation to achieve the qualities and properties of aspects of the invention.

In one embodiment, FIG. 1B may illustrate a post-refinement 808 where the pulp suspension 806 has passed the refiner 802 after 1 pass. For example, the post-refinement 808 may now include fibrillated cellulose fibers aqueous suspension. In another example, FIG. 1c illustrates an image of a post-refinement 808 that has passed the refiner 802 after 2 passes or 2 cycles. In one example, the fibrillated cellulose fibers in the post-refinement 808 is finer than that of what's shown in FIG. 1B. FIG. 1d may illustrate an image of a post-refinement 808 after 3 cycles/passes. In such an embodiment, the post-refinement 808 may include even finer fibrillated cellulose fibers than that in FIG. 1c.

In one embodiment, different cellulose starting concentrations have been evaluated and tested. For example, the post-refinement 808 may include fibrillated cellulose fibers and water with concentrations of fibrillated cellulose at about 2.5 wt. % of cellulose (and 97.5% water), about 3.0 wt. % of cellulose, about 3.6 wt. % of cellulose, and about 4.0 wt. % of cellulose were tested and used.

For example, insufficient refining was found for the cellulose concentration of about 2.5 wt. % of cellulose, and the properties were not tested. In other words, fibrillated cellulose fibers concentration with about 2.5 wt. % or even regular pulp suspension solution would be insufficient for achieving properties of aspects of the invention. The fibrillated cellulose with the post-refinement 808 with about 3.0 wt. %, about 3.6 wt. %, and about 4.0 wt. % are termed herein as L028, L029, and L030, respectively, in FIG. 5.

In one embodiment, various properties of the fibrillated cellulose were tested. For example, in Table 1, the properties of mechanical, water vapor and gas permeability are shown.

TABLE 1

| Fibrillated cellulose | Approximate Cellulose pulp concentration | DRY tensile strength (MPa) | DRY tensile index (Nm/g) | WET tensile strength (MPa) | WET tensile index (Nm/g) | Water vapor transmission rate, WVTR (g/m²·h) | Oxygen transmission rate, OTR (cm³/m²·24 h) | |
|---|---|---|---|---|---|---|---|---|
| | | | | | | | 5% RH | 50% RH |
| L028 | 3.00% | 86.89 ± 4.60 | 102.73 ± 5.70 | 7.24 ± 0.69 | 7.78 ± 0.72 | 918.96 | 0.0260 | 0.010 |
| L029 | 3.60% | 90.62 ± 4.55 | 95.20 ± 3.39 | 8.02 ± 2.00 | 5.54 ± 0.73 | 924.48 | 0.0243 | 0.0345 |
| L030 | 4.00% | 78.00 ± 5.72 | 91.63 ± 10.68 | 8.10 ± 1.62 | 6.45 ± 1.29 | 1013.76 | 1.002 | 0.350 |

Figure 2:
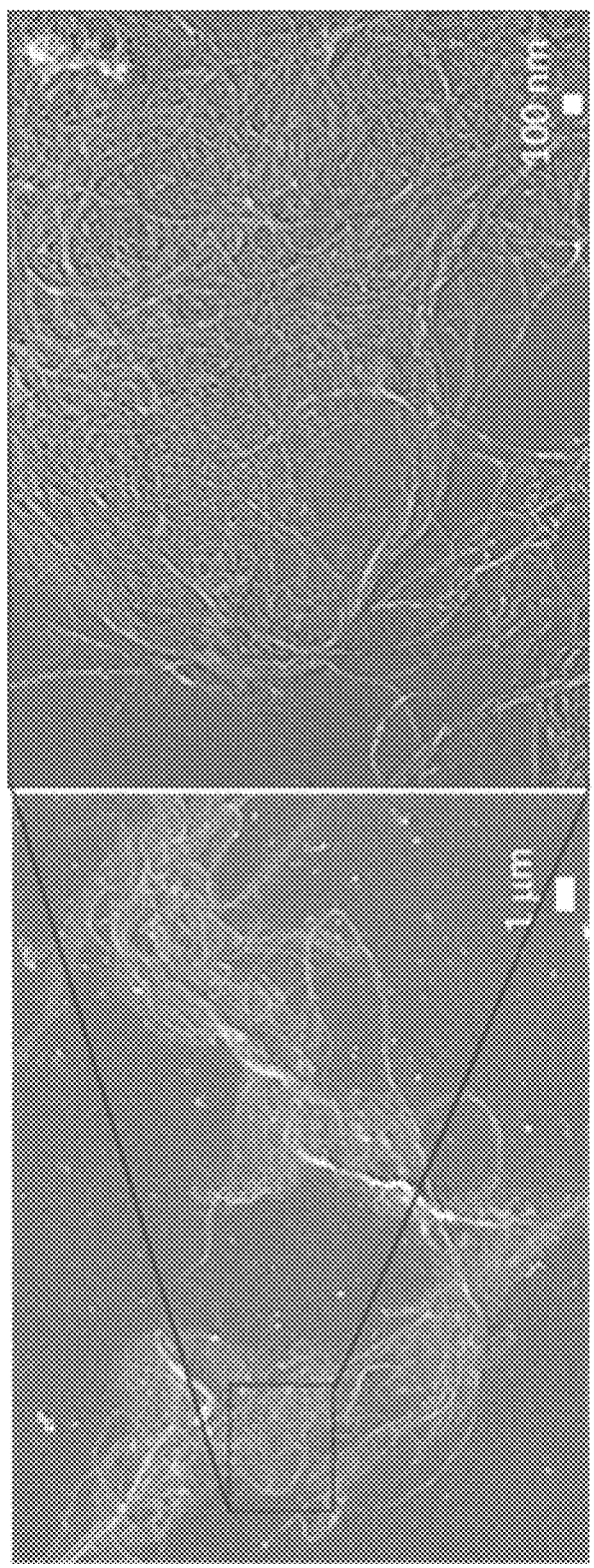
FIG. 2 is a scanning electron microscope (SEM) image for a material with fibrillated cellulose (3 wt. %) according to one embodiment.

In one embodiment, FIG. 2 may illustrate a SEM image of fibrillated cellulose at about 3 wt. % concentration.

Example 2

In one example, instead of using direct pulp solution to derive at the post-refinement 808, in Example 1 above, a semi-processed cellulose fibers may be obtained from a market source. As such, the semi-processed cellulose fibers (e.g., about 3 wt. %) is fed into a colloid mill and grind for about 1 minute. Optionally, the fibrillated cellulose fibers may further be processed in the refiner 802.

Figure 3:
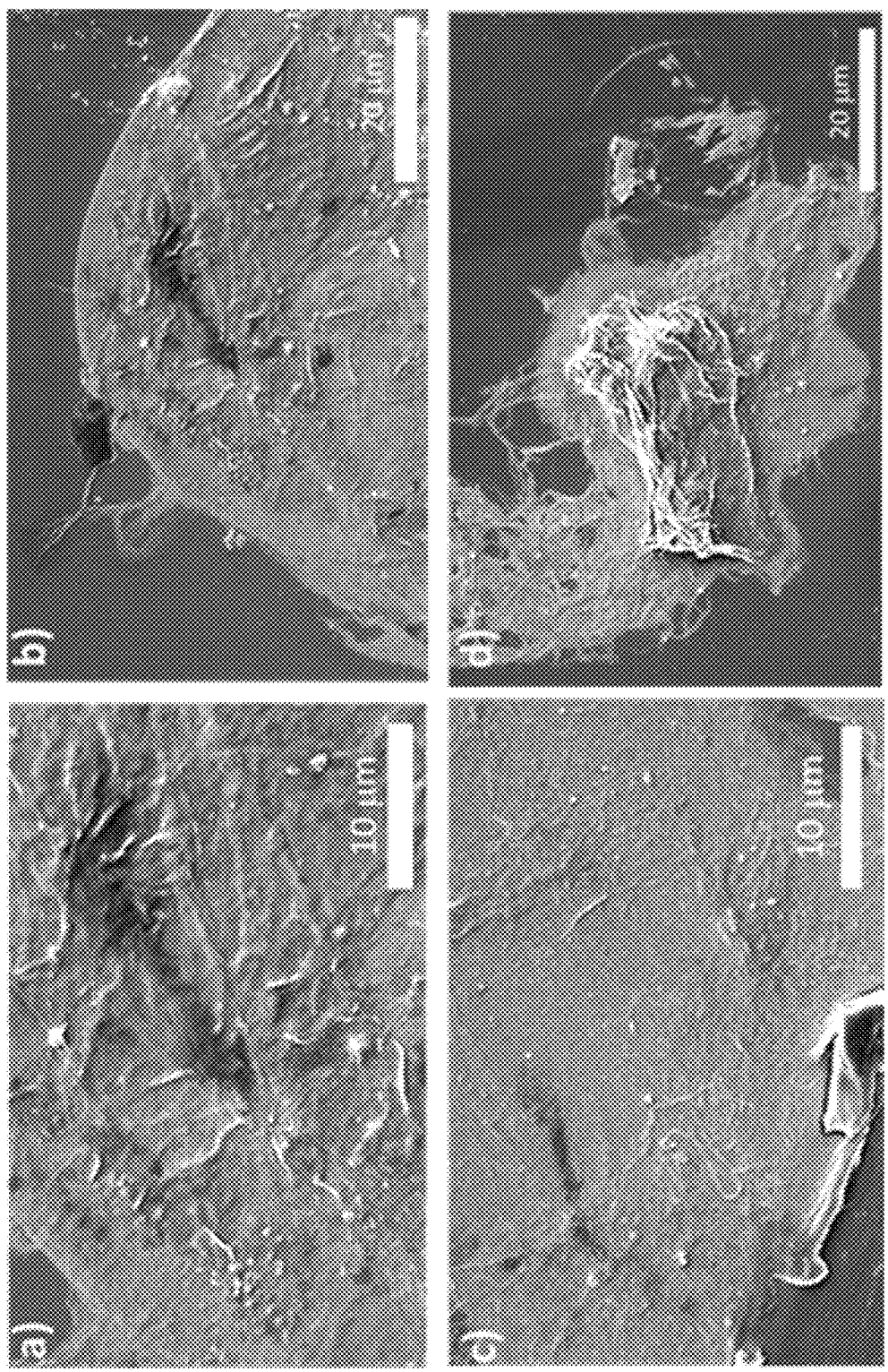
FIG. 3A to 3D are scanning electron microscope (SEM) images for semi-processed cellulose fibers where a-b are SEM images for Y-cellulose fibers and c-d for B-cellulose fibers according to one embodiment.

In one example, FIG. 3 may illustrate an SEM image for semi-processed fibers after colloid milling for 1 minute. For example, Table 2 shows the properties of different fibrillated cellulose from different source.

TABLE 2

| Fibrillated cellulose | Dry tensile strength (MPa) | Wet tensile strength (MPa) | OTR (cc/m²·24 h) | | WVTR (g/m²·24 h) |
|---|---|---|---|---|---|
| | | | 5% RH | 50% RH | |
| Y | 52.09 ± 7.75 | 6.99 ± 1.91 | 0.019 | 0.011 | 864.72 |
| B | 30.57 ± 3.64 | 2.01 ± 0.29 | 0.716 | 0.713 | 1075.68 |
| F | 38.97 ± 2.29 | 3.43 ± 0.20 | 115.44 | 92.98 | 1094.4 |

For example, FIG. 3 may illustrate where a-b are SEM images for Y-cellulose fibers in Table 2 and c-d are SEM images for B-cellulose fibers.

Figure 4:
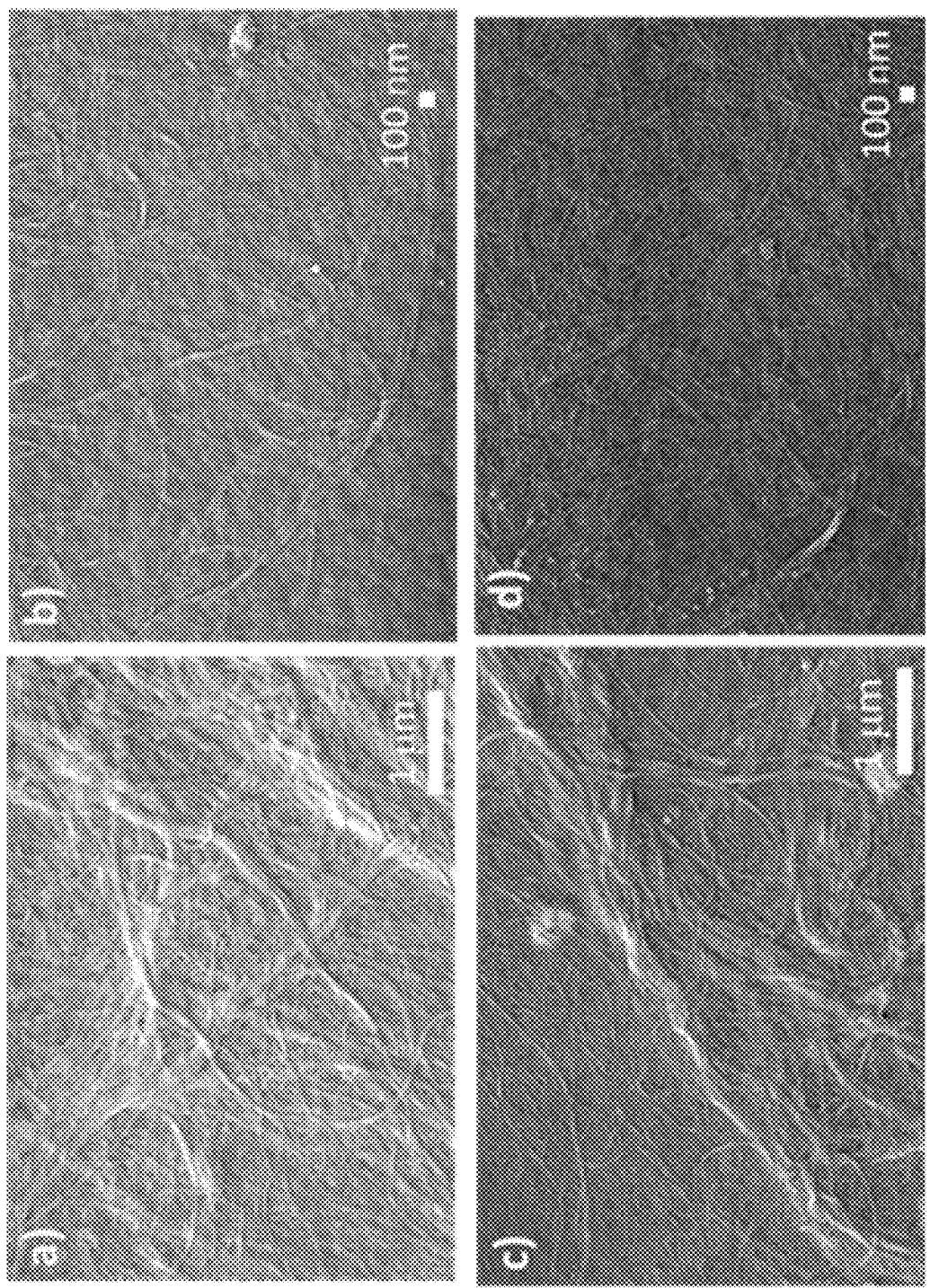
FIGS. 4A to 4D are SEM images for mechanically ground semi-processed fibers, where a-b are Y-cellulose fibers, and c-d for B-cellulose fibers according to one embodiment.

In another embodiment, FIG. 4 shows SEM images for semi-processed fibers after mechanically ground for 1 cycle/pass. For example, wherein FIG. 4 a-b are for Y-cellulose fibers, and FIG. 4 c-d are for B-cellulose fibers.

In one aspect, a mixer 804 may provide a suspension of pulp 806 of cellulose pulp in water comprises a mixture of cellulose pulp in water, wherein the cellulose to water weight ratio is about 0.01 to 100. In another embodiment, the weight ratio may be about 0.03 to 0.10. In some embodiments, the post-refinement 808 from the refiner 802 may be kept in the event that it may be used to be grinded again by the refiner 802. For example, as described above, the number of passes that the post-refinement 808 goes through the refiner 802 may be from 1-100. In another embodiment, the number of passes or cycles may be further limited to 1-10.

In another embodiment, a weight ratio of the fibrillated cellulose to water and/or the number of passes through the refiner 802 may be a function of the end products' desirable properties. For example, if the end product requires a low water vapor transmission, and a low oxygen transmission, then the post-refinement 808 may be with a weight ratio of cellulose to water closer to about 0.03-0.04 3-4% (as demonstrated by L28b-L30b) and/or the number of passes may increase. In yet another embodiment, the relative low water vapor transmission, and relative low oxygen transmission may indicate high shelf life while the relative high water vapor transmission and relative high oxygen transmission may indicate lower shelf life.

In one embodiment, the post-refinement 808 may be processed by a former 810. For example, the former 810 may generate an intermediate 818 based on the post-refinement 808 to a desirable material with the fibrillated cellulose. For example, the intermediate 818 may be at a ratio by weight of fibrillated cellulose to liquid (e.g., water) of about 0.001 to 99. In another embodiment, the ratio may be from about 0.001 to 0.10. In one embodiment, the former 810 may include a mesh or fibrous network. For example, the former 810 may include a negative pressure and/or positive pressure or any combination thereof. In one embodiment, the former 810 may apply pressure to separate the fibrillated cellulose in the post-refinement 808 from liquid to form the intermediate 818. Due to the fibrillated nature of the fibrillated cellulose fibers and through the process of the refiner 802, the fibers with different lengths may form the intermediate 818, as shown by the various SEM images in FIGS. 2-4 and 7.

In another embodiment, a base layer 812 may be used in conjunction with the post-refinement 808 to form the intermediate 818. In one embodiment, the GCM of aspects of the invention may include a composite material having a substrate layer of pulp (e.g., the base layer 812) and a fibrillated cellulose layer (e.g., from the post-refinement 808). For example, the former 810 may subject the base layer 812 to a mesh, a mold, or a frame to form a construct for the intermediate 818. For example, the base layer 812 may first be in a form of a solution or slush of water and pulp material. The slush may be in a tank and the mesh may be in the tank as well. Through a negative pressure such as a vacuum, water from the tank may be removed or reduced so the based layer 812 is formed on the mesh.

Subsequently, in one embodiment, the former 810 may include a sprayer or an applicator for spraying or applying the post-refinement 808 to the base layer 812 to form the intermediate 818. With the different sizes of fibers between the base layer 812 and the post-refinement 808, the post-refinement 808 is infused with the base layer 812. In one embodiment, the post-refinement 808 may be applied or sprayed on a surface of the intermediate 818 that carries edible items. For example, suppose an end product is a bowl, the post-refinement 808 may be applied or sprayed onto an interior surface of the end product.

In one embodiment, the intermediate 818 may exhibit patterns of the mesh or the fibrous network, as shown in 502 or 504, on an exterior surface thereof.

In yet another embodiment, the former 810 may spread the intermediate 818 on a flat surface for drying or forming by natural process.

In another embodiment, a dryer 814 may further be provided to dry or dehumidify the intermediate 818. In one embodiment, the dryer 814 may provide a drying condition of 30° Celcius to 200° Celcius. In another embodiment, the dryer 814 may include a heated surface, such as an infra-red heating. In another embodiment, microwave heating or air heating may be used without departing from the spirit and scope of the embodiments. In yet another embodiment, the dryer 814 may also be aided by negative pressure and/or positive pressure.

Example 3

In one example of the end products that may embody aspects of the invention, a cellulose based bowl is successfully produced by adopting combinations of materials and methods described previously. In one embodiment, the functionality of the cellulose based food container, in this example, may be used to prove filling typical cooking oil into the container, as shown in FIG. 5. In this example, the cooking oil with the cellulose-based food container may be heated by microwave at 800 W for 4 minutes and observed for 10 days, which is shown in FIG. 5. In such illustration, the container in FIG. 5 may represent ones made of fibrillated cellulose L28b, L29b, L30b, and Y. In one embodiment, each of the ones in FIG. 5 may be able to hold oil for about 10 days.

In another embodiment, another set of testing was also carried out by filling instant noodle (after it is cooked after hot water is added) into a container embodying the composite material according to one embodiment. The observations were recorded on the second day. FIG. 6A shows an example of a fibrillated cellulose structure in a container, such as a food container. For example, FIG. 6A illustrates a series of images of a fibrillated cellulose filled with boiling water and let it stand for about 5 minutes.

In another embodiment, FIG. 6B illustrates a series of images of the fibrillated cellulose filled with boiling water and microwave heated at 800 W for about 2 minutes.

FIG. 7 is another image showing a SEM image for a structure of fibrillated cellulose in food container in FIGS. 6A and 6B according to one embodiment.

Example 4

Figure 9:
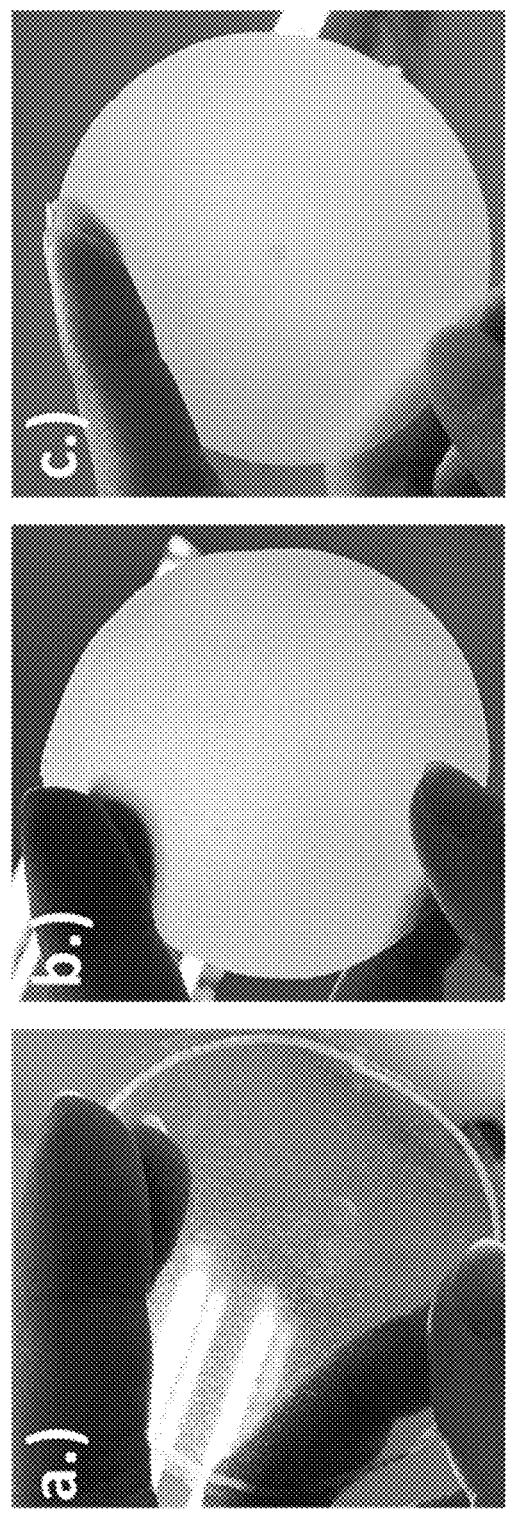
FIGS. 9A to 9C illustrate three images showing a film according to one embodiment.
Figure 11A:
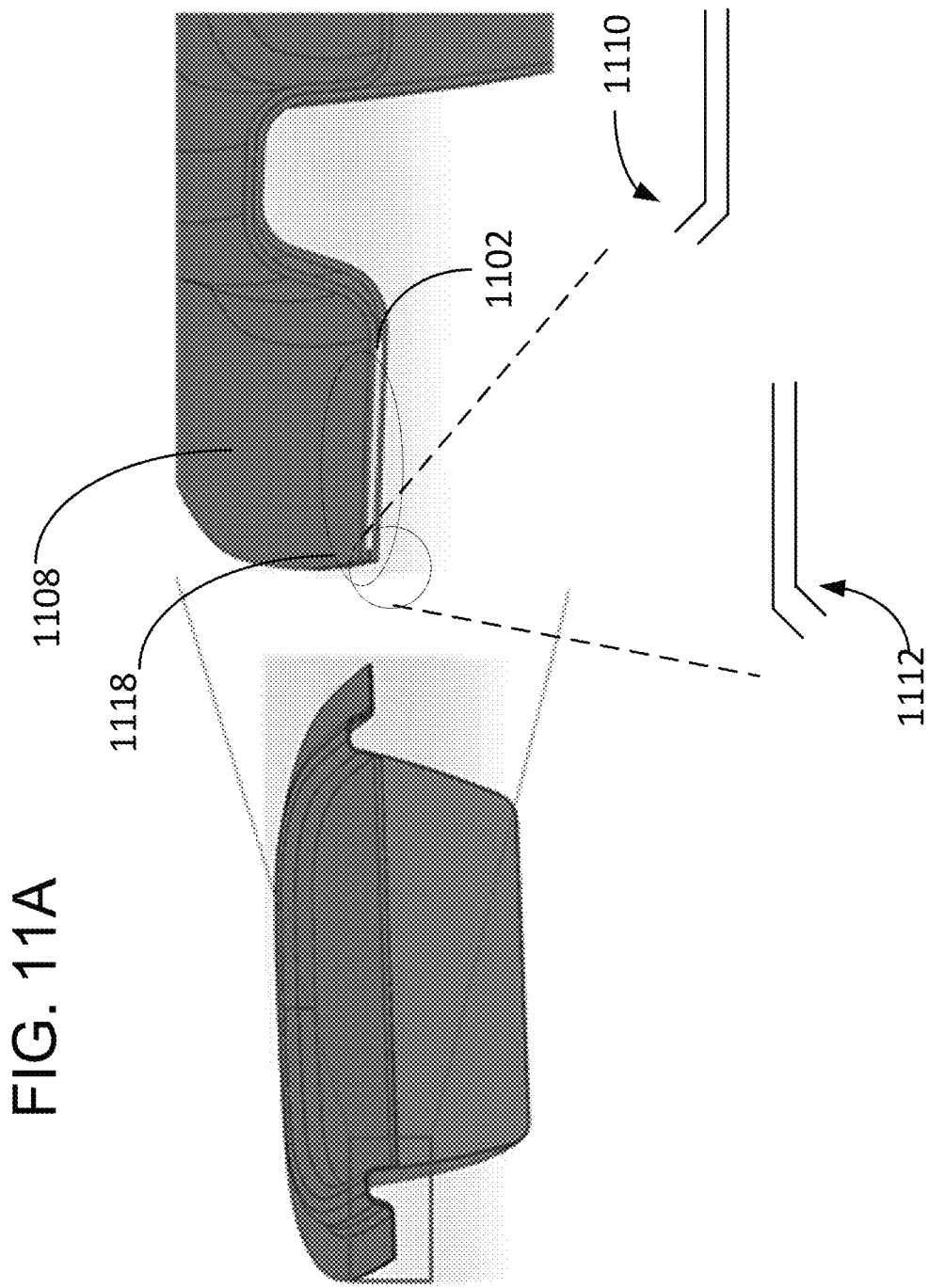

Referring now to FIGS. 9a through 9c, images illustrate a film according to example 4 of an embodiment.

In one embodiment, a composite material according to aspects of the invention may be in a transparent composite film based on fibrillated cellulose. In one example, the film may be produced by dissolving the fibrillated cellulose and pullulan powder in water to produce solutions containing about 1 wt. % of solute, separately. In the pullulan powder dissolution, the powder may be progressively added thereto, and the solution may be heated via microwave at power of 800 W for 1 minute. In one embodiment, this process may repeat for about 4-5 times until a clear solution is formed.

In one embodiment, to produce a composite film, the fibrillated cellulose, such as the post-refinement 808, to pullulan may be with a ratio of about 1:1, For example, about 250 g of the post-refinement 808 (e.g., the fibrillated cellulose of about 1%) may be mixed with about 250 g of pullulan solution to produce a solution with about 0.5% solute. Then, about 100 g of the mixed solution was poured onto a hydrophobic surface, e.g., silicone surface and allowed to dry at room temperature.

In another embodiment, a fibrillated cellulose to a pullulan with a ratio of 2:1, 250 g of the post-refinement (e.g., the fibrillated cellulose of about 2%) may be mixed with about 250 g of pullulan solution to produce a solution with about 1% solute. Then, about 100 g of the mixed solution was poured onto a hydrophobic surface, e.g., silicone surface and allowed to dry at 50° C. and 12 hours.

As illustrated, FIGS. 9a through 9c may illustrate images of cellulose based film where fibrillated cellulose to pullulan with a ratio of a) 0:1, b) 1:1, and c) 2:1.

In one embodiment, the addition of pullulan may enhance the film forming process to smooth the film's surface, where film made of fibrillated cellulose (e.g., the post-refinement 808), herein termed as L41b below, is highly wrinkled. Whereas the other films with pullulan provide smoother and even surface. In one embodiment, the film of the composite material with the fibrillated cellulose and pullulan may be generally free from uneven surface.

In yet another embodiment, mechanical properties of transparent composite film were shown below, where fibrillated cellulose is denoted as L41b, and pullulan is represented as B.

TABLE 3

Properties of fibrillated cellulose films with the addition of pullulan.

| Sample | | 100B | L41b:B 1:1 | L41b:B 1:1 | L41b:B 2:1 | L41b:B 1:1, 6% WSA |
|---|---|---|---|---|---|---|
| Weight (g) | | | 0.75 | 1 | 1 g | 1 |
| Thickness (mm) | | 0.025 | 0.035 | 0.06 | 0.05 | 0.06 |
| Dry Tensile Strength (MPa) | | — | 33.54 ± 5.49 | 42.07 ± 11.13 | 50.055 ± 6.98 | 60.9 ± 5.17 |
| Dry Young's Modulus (MPa) | | — | 1176.01 ± 1469.73 | 6062.55 ± 886.95 | 13481.95 ± 13055.80 | 8203.87 ± 588.09 |
| Dry Tensile Index (Nm/g) | | — | 38.95 ± 5.58 | 39.94 ± 6.23 | 51.54 ± 8.07 | 54.73 ± 6.67 |
| Wet Tensile Strength (MPa) | | N.A | N.A | N.A | | 4.64 ± 1.11 |
| Wet Young's Modulus (MPa) | | N.A | N.A | N.A | | 185.97 ± 228.53 |
| Wet Tensile Index (Nm/g) | | N.A | N.A | N.A | | 3.98 ± 0.81 |
| OTR ($cm^3/m^2$ 24 h) | 5% RH | | | | 0.055 | |
| | 50% RH | | | | 0.137 | |
| WVTR ($g/m^2$ h) | | 103.16 | 76.57 | 67.09 | 69.01 | |

Example 5

Fibrillated Cellulose with Water Repellant

In one embodiment, aspects of the invention may include fibrillated cellulose with water repellant. In one example, the mixture may include a correct ratio of cellulose and a water repellant, and blended for 3 minutes using a mechanical blender. The mixture may further be diluted to 4000 mL and pour onto the former 810. In one aspect, the former 810 may apply negative and/or positive pressure to produce a wet preform with a dryness of 25-35%. The mechanical and barrier properties of the mixture may be shown in Table 4.

TABLE 4 illustrates properties of fibrillated cellulose films with different water repellant.

| Sample Name | M055 + 10% Carnauba wax | M055 + 20% Carnauba wax | M055 + 10% Canola oil |
|---|---|---|---|
| Weight (gr) | 5 g GCM + 0.5 g wax | 5 g GCM + 1 g wax | 5 g GCM + 0.5 g oil |
| Thickness (mm) | 0.156 | 0.168 | 0.154 |
| Tensile Strength (MPa) | 78.96 ± 26.68 | 76.215 ± 14.75 | 86.47 ± 4.8 |
| Young's Modulus (MPa) | 7611.49 ± 788.28 | 7485.75 ± 332.20 | 8045.41 ± 742.03 |
| Tensile Index (Nm/g) | 88.85 ± 27.80 | 86.69 ± 21.71 | 96.34 ± 2.72 |
| Wet tensile Strength (MPa) | 11.14 ± 2.48 | 15.10 ± 2.29 | 9.03 ± 1.48 |
| Wet Young's Modulus (MPa) | 1258.27 ± 203.63 | 1720.10 ± 407.88 | 949.51 ± 61.29 |
| Wet Tensile Index (Nm/g) | 12.10 ± 2.27 | 16.82 ± 2.81 | 9.69 ± 1.52 |
| OTR ($cm^3/m^2 \cdot 24$ h)  5% RH | 0.047 | 0.104 | 0.009 |
| 50% RH | 0.044 | 0.022 | 0.040 |
| WVTR ($g/m^2 \cdot 24$ h) | 614.4 | 411.6 | 905.52 |

Overall, aspects of the invention overcome shortcomings of the prior approaches where there are toxic chemicals (e.g., fluoropolymers and its derivatives) are added. Aspects of the invention also overcome the shortcomings of prior approaches of using pulps as the base layer or layers. It is to be understood that pulp fibers are in the 10 to 50 micrometer (μm) range for their diameters. Whereas aspects of the invention are finer in size, such as in the range of below 1 μm.

Bonding and Sealing

In yet a further embodiment, with the end products from the above disclosures and examples, aspects of the invention may further involve bonding, sealing, or securing a composite material with the above compositions/constructions and another composite material with the above compositions/constructions. In another embodiment, the bonding, sealing or securing may be with another composite material that are not derived from the above disclosure.

For example, suppose a first composite material may be a carrier, a container body, such as a bowl, a cup, a capsule, a tray, or the like, as seen in FIGS. 10A-10B and 11A to 11C. The second composite material may be a cover, a lid, a cap, a membrane, or a film. In one example, to bond the first composite material with the second composite material, adhesive may be used to bond, secure, or seal the space between the first composite material and the second composite material. In another embodiment, a cellulose container product may include a body and a cover, where the cover could be in the form of lid, tray, membrane, or film. For instance, where the cover is a membrane or film, additional adhesive may be required to seal the cover to the container body. The source of glue is ubiquitous and could be one of the following examples. In one example, the adhesive may be a food grade glue or a glue whose source may be ubiquitous and may be one of the following examples:

1. Starch glues—plant-based starch, e.g., tapioca, wheat, potato, sweet potato, corn. Chemically modified starch, e.g., cationic starch, inorganic salt starch;
2. Liquid glues—water based glues that comprises polyvinyl acetates (PVA), vinyl acetate ethylenes (VAE) and vinyl acetate acrylates (VAA);
3. Dextrin glues—may comprises water (about 55-60%), Dextrin from Potato Starch (about 35-40%), Glycol monopropylene (about 1.46%), Glycerin (about 0.88%)
4. Hot melt glues—ethylene-vinyl acetate (EVA) hot melt glue, metallocene hot melt glue, fugitive hot melt glue and polyurethane reactive (PUR) hot melt glue, polyvinyl alcohol (PVOH) or partially hydrolysed polyvinyl acetate (PVA) hotmelt/other hotmelts.
5. Biobased hotmelt—PLA, PHA;
6. Biobased—epoxy resin;
7. Animal glues—comprises gelatin, water, magnesium sulfate, corn sugar, glycerin and protein (e.g., chondrin, which provides glue strength for bonding potential, and gluten, which provides gelling strength for tackiness or hardness);
6. Soybean glues—e.g., polyacrylated epoxidized soybean oil;
7. Silicone sealant;
8. Wax—natural wax (e.g., beeswax, palm wax) and synthetic wax;
9. Phenol formaldehyde, urea formaldehyde;
10. Cyanoacrylate;
11. Polysaccharide (agarose); and
12. Metallocene.

In addition to the adhesive material provided above, aspects of the invention may include an adhesion process. In one example, the adhesion process of the first composite material and the second composite material may be done by applying the adhesive onto the first composite material or the second composite material. The adhesion may undergo a further drying or heating process, e.g., from room temperature to 200 degrees C., which may depend on the type of adhesive selected. In other embodiments, the adhesion process may also be aided by applying negative pressure and/or positive pressure, either to the first or the second composite material. In yet another embodiment, the drying of adhesion may be done by ultrasonic, infrared, microwave, air, hot press, and any combination thereof.

In other embodiments, where the second composite material may comprise a cellulose-based membrane or film, the adhesion of these cellulose-based films onto the first composite material may be done by the addition of moisture and application of positive or negative pressure, or any combination thereof. For example, the membrane or film may be a mechanically treated cellulose that may comprise cellulose, micro-fibrillated, and nano-fibrillated cellulose derived from a plant. In other embodiments, the membrane may comprise a chemically modified cellulose (e.g., Carboxymethyl cellulose, methyl cellulose, hydroxyethyl cellulose).

In yet another embodiment, the bonding between the first and second composite materials may be done without an adhesive. For example, suppose the second composite material may be in the form of lid or tray, sealing, securing or bonding may be done with a mechanical interlock design. For example, the container body may comprise an extended feature while the second composite material may include a matching hole that could interlock with that extended part from the container body. Referring now to FIG. 10A, a top view of a carrier or a first composite material 1006, such as a bowl or a capsule. In this embodiment, the first composite material 1006 may include an extended feature 1008, such as a wider lip or rim or circumference of the first composite material 1006. For example, such extended feature 1008 may increase a surface area for the bonding, sealing or securing between the first and second composite materials. This extended feature 1008 in one embodiment, may include one or more holes, such as 1002. A second composite material, such as 1020 in FIG. 10B, may include one or more protrusions or tongues that may be a size that is of frictional fit to the holes 1002 so that downward forces are needed to apply on the second composite material 1020 to snap the second composite material 1020 in place to the first composite material 1006.

In yet another embodiment, the one or more protrusions or tongues may be on the extended feature 1008 of the first composite material 1006 and that the holes 1002 may be on the second composite material 1020, in a reverse construction.

In yet another embodiment, to further increase the effectiveness of mechanical bonding, a patch or a portion 1004 of the extended feature 1008 may have an uneven surface whereas other parts or portions of the extended feature 1008 may be of a smoother or a planar surface.

As such, the first and the second composite materials 106 and 1020 may be interlocked when further pressure is applied onto either the first or the second composite material.

In yet another embodiment, the bonding, sealing or securing of the first composite material 1006 and the second composite material 1020 may further be aided by one or more columns or filler 1022. As seen in FIG. 10B, the second composite material 1020 may be secured with an extended feature, such as the extended feature 1008 in FIG. 10A, via one or more filler 1022. In one example, the one or more fillings 1022 may comprise nanofibrillated cellulose or fibrillated cellulose. In another embodiment, the one or more filler 1022 may include an adhesive.

In other embodiments, the sealing of container may be aided with an adhesive. For example, referring to FIG. 11A, an adhesive 1102 may be applied onto an engagement zone 1118. In one embodiment, the engagement zone 1118 may be an area where an extended feature 1108 of the first composite material engages or contacts a portion of the second composite material 1108. In another embodiment, applications of negative and/or positive pressure onto the engagement zone 1118 may be used. The sealing is thus afforded by both the adhesive and the physical tightness of container and cover.

In another example, ends of the extended feature 1108 of the first composite material and ends of the second composite material may tilt upward in 1110 between about 0 to about 90 degrees. In another embodiment, the ends of the extended feature 1108 of the first composite material and the ends of the second composite material may bend or curve downward in 1112 between about 0 to about 90 degrees.

Referring now to FIGS. 11B and 11C, grooves 1114, channels 1116 or corrugation may be provided on a matching side of the first composite material and the second composite material so that, especially when the adhesive is applied, bonding, sealing or securing may be further enhanced.

Aspects of the current invention may apply to a container body and cover derived from plant-based cellulose, micro-fibrillated cellulose, and/or nano-fibrillated cellulose.

1. In other embodiments, the container and cover may comprise a polymer, for example, polyethylene (PE), polypropylene (PP), polyvinyl alcohol (PVOH), polylactic acid (PLA), polyhydroxyalkanoates (PHA).
2. In one of the embodiments, the container body and cover may further comprise an additional polymer and any combination thereof.
3. In other embodiments, the container body may comprise a polymer laminated cellulose layer, where the polymer comprises PE, PP, PVOH, PLA, PHA.

In one aspect, the first composite material may be used for a range of purposes, such as it may be used for containing edible items. For example, it may comprise dried food or seasons in the form of powder, granules, flakes or liquid, and any combination thereof. In other embodiments, it may be used for containing non-edible items, such as cosmetics, medical products, and electronic items.

In other embodiments, the hot melt polymer may be applied to the container body or cover or both of them by melting the polymer (e.g., PE, PP, PVOH, PLA, PHA) at the corresponding temperature and injected on the container or cover and solidified at temperature lower than the melting point of the corresponding polymer. After the filling process of the container body, the cover is placed on the container body and the adhesion process is done by ultrasonic, infrared, microwave, air, hot press and any combination thereof with negative or positive pressure.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, aspects of the invention overcome challenges of relying on existing practices of using chemical formulas to provide enhanced properties for cellulose materials.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A method for bonding two biodegradable materials comprising:
    configuring a carrier, said carrier comprising a composite material with fibrillated cellulose having independently derived plant fibers, said composite material being generally free from toxic chemical additives, said chemical additives adapted for improving dry tensile strength, enhanced oil barrier, gas and/or liquid impermeability, a dry tensile modulus, or a dry tensile index;
    wherein the composite material comprises properties of:
        an oxygen transmission rate of about 8000 cm$^3$ m$^{-2}$ 24 h$^1$ or less,
        a water vapor transmission rate of 3000 g m$^{-2}$ 24 h$^1$ or less,
        a dry tensile strength of about 30 MPa or higher,
        a dry tensile modulus of about 4 GPa or higher, and
        a dry tensile index of about 45 Nm g$^1$ or higher;
    wherein the carrier comprises walls connected to a base at one end for defining a volume, said carrier further comprising a lip extending from the other end of the walls;
    configuring a cover having a portion thereof to engage the lip of the carrier at an engagement zone;
    infusing a filler at the engagement zone; and
    enclosing the volume defined by the carrier via sealing the cover and the carrier having the infused filler boding at a mechanical interlocking design with one or more protrusions or tongues and a frictional fit to holes in the engagement zone,
    wherein the filler comprises a composite of fibrillated cellulose and independent of an adhesive.

2. The method of claim 1, wherein the carrier comprises a bowl, a capsule, a cup, or a tray.

3. The method of claim 1, wherein the cover comprises a lid, a cap, a membrane, or a film.

4. The method of claim 1, further comprising applying negative or positive pressure to the engagement zone.

5. The method of claim 1, wherein the portion of the cover comprises one or more protrusions for fitting to one or more holes on the lip of the carrier.

6. The method of claim 1, wherein the lip of the carrier comprises one or more protrusions for fitting to one or more holes of the portion of the cover.

7. The method of claim 1, further comprising inserting edible items to the volume of the carrier before infusing the filler at the engagement zone to enclose the volume defined by the carrier.

8. A method for bonding two biodegradable materials comprising:
    configuring a carrier, said carrier comprising a composite material with fibrillated cellulose having independently derived plant fibers, said composite material being generally free from toxic chemical additives, said chemical additives adapted for improving dry tensile strength, enhanced oil barrier, gas and/or liquid impermeability, a dry tensile modulus, or a dry tensile index;
    wherein the composite material comprises properties of:
        an oxygen transmission rate of about 8000 cm$^3$ m$^{-2}$ 24 h$^1$ or less,
        a water vapor transmission rate of 3000 g m$^{-2}$ 24 h$^1$ or less,
        a dry tensile strength of about 30 MPa or higher,
        a dry tensile modulus of about 4 GPa or higher, and
        a dry tensile index of about 45 Nm g$^1$ or higher;
    wherein the carrier comprises walls connected to a base at one end for defining a volume, said carrier further comprising a lip extending from the other end of the walls;
    configuring a cover having a portion thereof to engage the lip of the carrier at an engagement zone;
    infusing a filler at the engagement zone; and
    enclosing the volume defined by the carrier via sealing the cover and the carrier having the infused filler boding at a mechanical interlocking design with one or more protrusions or tongues and a frictional fit to holes in the engagement zone,
    wherein the filler comprises a composite of fibrillated cellulose and independent of an adhesive.

* * * * *